J. F. HILL.
COMBINATION SPEAR AND CUTTER.
APPLICATION FILED SEPT. 22, 1919.

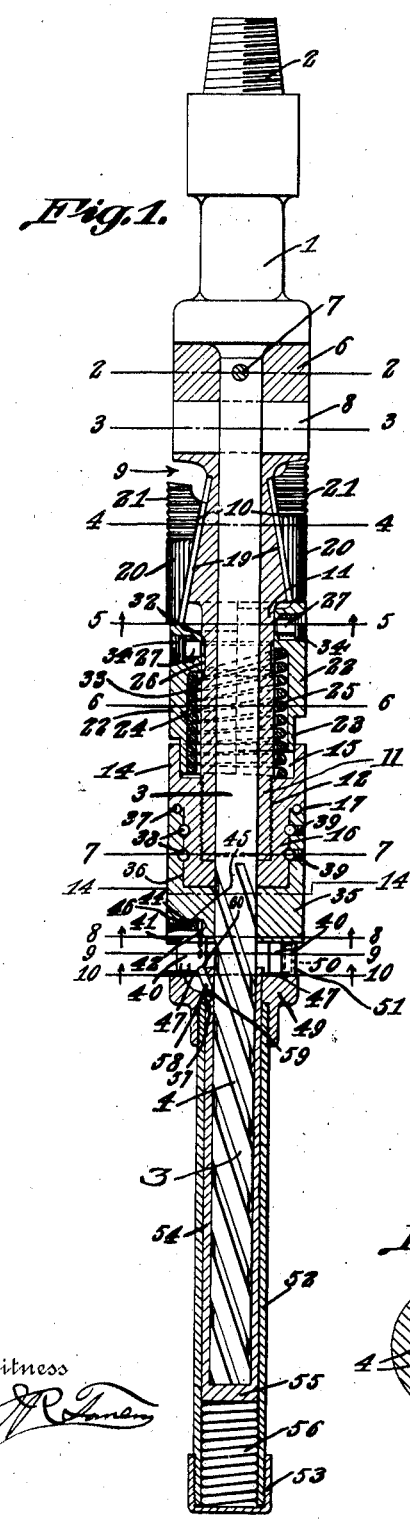

1,338,773.

Patented May 4, 1920.
2 SHEETS—SHEET 2.

J. F. Hill, Inventor

Witness
By C. A. Snow & Co.
Attorneys ic
UNITED STATES PATENT OFFICE.

JAMES F. HILL, OF SALEM, OHIO.

COMBINATION SPEAR AND CUTTER.

1,338,773.     Specification of Letters Patent.     Patented May 4, 1920.

Application filed September 22, 1919. Serial No. 325,603.

*To all whom it may concern:*

Be it known that I, JAMES F. HILL, a citizen of the United States, residing at Salem, in the county of Columbiana and State of Ohio, have invented a new and useful Combination Spear and Cutter, of which the following is a specification.

The device forming the subject matter of this application is adapted to be used for cutting off a section of piping in a well, and for pulling the piping. The invention aims to provide novel means whereby the cutters may be actuated and controlled, to provide novel means for gripping the pipe, and, generally, to improve and to enhance the utility of devices of that kind to which the invention appertains.

Within the scope of what is claimed, a mechanic may make changes without departing from the spirit of the invention, or sacrificing the utility thereof.

In the drawings:—

Figure 1 shows in longitudinal section, a device constructed in accordance with the invention, parts appearing in elevation;

Figs. 2, 3, 4, 5, 6, 7, 8, 9 and 10 are cross sections taken, respectively, on the lines 2—2, 3—3, 4—4, 5—5, 6—6, 7—7, 8—8, 9—9, and 10—10, of Fig. 1;

Fig. 12 is a fragmental section showing one of the latches and attendant parts;

Fig. 13 is a sectional detail showing one of the dogs and attendant parts.

Fig. 14 is a section on the line 14—14 of Fig. 1.

Figure 5:
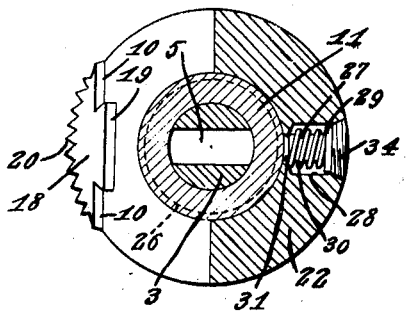
Figure 6:
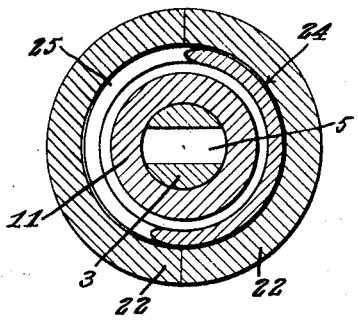
Figure 7:
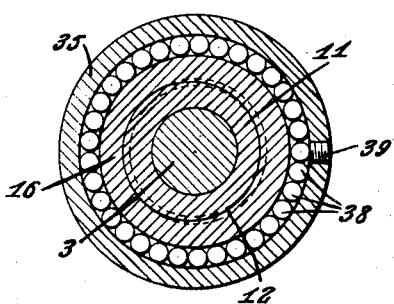
Figure 8:
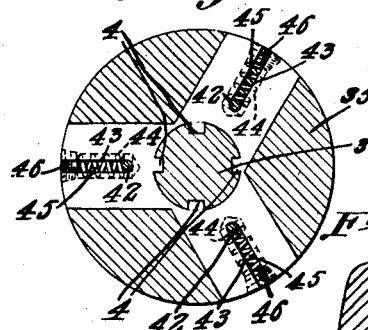
Figure 9:
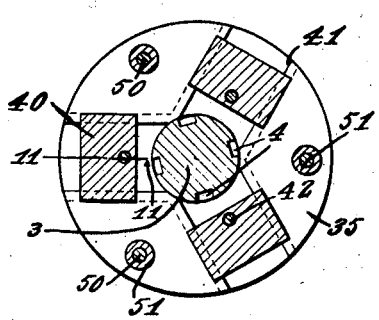
Figure 10:
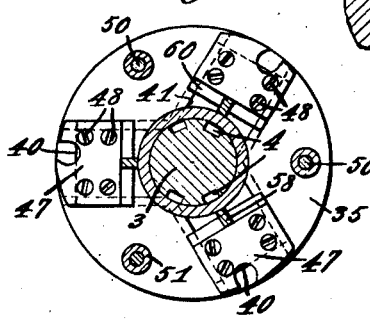
Figure 11:
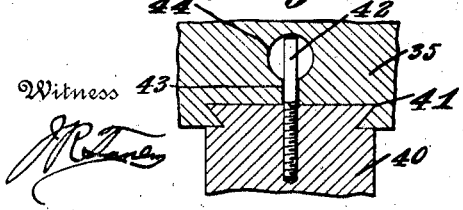
Fig. 11 is a section taken on the line 11—11 of Fig. 9.

The device includes a head 1 provided with any suitable means 2 for connecting the head to an operating means of the kind used in pipe-cutting and pipe-fishing operations in connection with well drilling. The head 2 has a stem 3 provided at its lower end with spiral actuating grooves 4, forming a lead screw. There is a longitudinal slot 5 in the stem 3.

The numeral 6 denotes the body of the tool, the body receiving the stem 3 and being connected thereto by a shearing pin 7 which may be made of wood. The body 6 carries a cross key 8 received in the slot 5 of the stem 3 and adapted to move in said slot, when relative movement between the head 1 and the body 6 takes place, as hereinafter described.

The body 6 is supplied with recesses 9, the bases 10 of which are downwardly and outwardly inclined. The body 6 is reduced to form a neck 11 threaded at 12 into a collar 14 having a recess 15 in its upper end, the collar including a reduced lower end 16 defining an external shoulder 17. Wedge-shaped jaws 18 are mounted for longitudinal reciprocation on the bases 10 of the recesses 9 and are dovetailed thereto as indicated at 19. On their outer surfaces, the jaws 18 are supplied with longitudinal ribs 20 and transverse ribs 21.

Semi-circular slides 22 surround the neck 11 of the body 6 and are adapted to coöperate at their upper ends with the lower ends of the jaws 18. The slides 22 have reduced lower extensions 23 received in the recess 15 of the collar 14, the slides being provided with an internal chamber 24 receiving a compression spring 25 disposed about the neck 11, the upper end of the spring abutting against the slides 22, and the lower end of the spring abutting against the collar 14 within the recess 15.

The neck 11 of the body 6 is supplied with longitudinal grooves or seats 26, the upper ends of which are undercut, as indicated at 32, the lower ends of the seats being downwardly and outwardly inclined as disclosed at 33. The slides 22 are supplied with openings 28 wherein latches 27 are mounted to slide, the latches having heads 29 at their outer ends, the heads being engaged by springs 30 located in the openings 28 and tending to move the latches outwardly. The inner ends 31 of the latches 27 are of conical form, so that they may interlock with the undercut end portions 32 of the seats 26 in the neck 11. Plugs 34 are threaded into the openings 28 and limit the outward movement of the latches 27 under the action of the springs 30.

The numeral 35 marks a rotatable collar having a recess 36 wherein the lower end of the collar 14 is received. The lower portion of the collar 35 (compare Figs. 14 and 1) has projections 70 coöperating with the spiral grooves 4 of the stem 3. End-thrust balls 37 are interposed between the upper end of the collar 35 and the shoulder 17 on the collar 14. Side balls 38 are located between the collar 35 and the lower end of the collar 14, the balls 38 being accessible through openings in the collar 35, closed at their outer ends by plugs 39.

Tool carriers 40 are mounted on the lower end of the collar 35 for inward and outward adjustment, radially of the collar, the carriers being dovetailed to the end of the collar, as shown at 41. The tool carriers 40 have pins or projections 42 movable in radial slots 43 in the end of the collar 35, the slots communicating with radial bores 44 in the collar. Plugs 46 are mounted in the outer ends of the bores 44, compression springs 45 being located in the bores, between the plugs and the pins or projections 42 of the tool carriers 40, the springs serving to thrust the tool carriers inwardly. Cutters 47 are secured at 48 to the lower ends of the tool carriers 40.

The numeral 49 designates a cap secured by bolts 50 to the collar 35, and held apart from the collar by tubular spacers 51 surrounding the bolts. A pipe 52 is threaded into the cap 49 and is provided at its lower end with a closure 53. A tube 54 is slidable within the pipe 52 and surrounds the lower end of the stem 3 of the head 1, the lower end of the tube being closed as shown at 55. A compression spring 56 is located in the pipe 52 and abuts against the closure 53 of the pipe 52 and the end of the tube 54.

Longitudinal grooves 57 are formed in the outer surface of the tube 54, near to the upper end thereof, and in these grooves, dogs 58 are disposed, the lower ends of the dogs being pivoted at 59 to the tube 54, the upper ends of the dogs coöperating with seats 60 fashioned in the inner ends of the tool carriers 40. The dogs 58 serve to move the tool carriers 40 and the cutters 47 outwardly, against the action of the springs 45. The collar 35, the cap 49, the pipe 52 and its closure 53 may be denominated a cutter support, the tube 54 and the dogs 58 constituting a cutter-advancing means.

The operation of the tool will now be set forth, and in this connection it may be stated that while the tool is being lowered, the inner ends 31 of the latches 27 are engaged with the upper ends 32 of the seats 26 in the part 11 of the body 6, to hold the slides 22 depressed and to hold the spring 25 under compression, the jaws 18 being free for longitudinal sliding movement. When the tool has been lowered to the desired point, an upward pull on the head 1 causes the shearing pin 7 to break, but not until the jaws 18 have moved outwardly and gripped the pipe which is to be cut, due to the inclination of the bases 10 of the recesses 9, the operation alluded to being well known in the art. The body 6 is now held against rotation at the desired depth in the casing.

When the head 1 and the stem 3 are drawn upwardly, the lead screw 4 coöperates with the projections 70 on the collar, and the cutters 47 sever the pipe. Relative to the means for advancing the cutters 47 while the pipe is being cut, it will be observed that the spring 56 tends to move the tube 54 upwardly, the dogs 58 (Fig. 13) forcing the carriers 40 and the cutters outwardly. After the dogs have passed the horizontal, the dogs swing downwardly into the grooves 57, being recalled that the tube 54 has been thrust upwardly above the position shown in Fig. 13, by the action of the spring 56. By this time the pipe has been severed, and when the dogs 58 swing downwardly, the carriers 40 and the cutters 47 are set free for inward sliding movement or retraction under the action of the springs 45. The head 1 is pulled upwardly, the key 8 of the body 6 arrives at the lower end of the slot 5 in the stem 3 of the head, whereupon the entire device, with the severed upper section of the pipe, may be withdrawn from the well. The latches 27 may be released at any time by the use of a set of jars, after the well known custom of well drillers. The slides 22 move upwardly under the action of the spring 25, the jaws 18 move upwardly under the thrust of the slides, and the hold of the jaws on the pipe is released.

The tool combines a spear and a cutter in a single device and, consequently a marked saving of time and labor is effected.

I claim:—

1. In a tool of the class described, a body having gripping means; a cutter support journaled on the body below the gripping means; a cutter on the cutter support; a stem journaled in the body and in the support and having limited longitudinal movement therein; and interengaging elements on the support and on the stem for rotating the support when the stem is moved longitudinally.

2. In a tool of the class described, a body having gripping means; a cutter support journaled on the body below the gripping means; a cutter carrier movable on the support; spring-actuated cutter advancing means movable longitudinally of the support; a stem journaled in the body and in said means and having limited longitudinal movement therein; and interengaging elements on the stem and on the support for rotating the support when the stem is moved longitudinally.

3. In a tool of the class described, a body having gripping means; a cutter support journaled on the body below the gripping means; a cutter carrier movable on the support; a stem journaled in the body and having longitudinal movement therein, the stem including a lead screw threaded into the support; and spring-actuated means for advancing the carrier.

4. In a tool of the class described, a body having gripping means; a cutter support journaled in the body; a cutter carrier movable on the support; a stem journaled in the body and having longitudinal movement therein; interengaging elements on the support and on the stem for rotating the support when the stem is moved longitudinally; a member slidable in the support; spring means for advancing said member; and a dog pivoted to said member and coacting with the carrier to advance the carrier when said member is advanced.

5. A device of the class described, constructed as set forth in claim 4 and further characterized by the fact that the dog is foldable to release the carrier, in combination with spring means for retracting the carrier when the same is released.

In testimony that I claim the foregoing as my own, I have hereto affixed my signature in the presence of two witnesses.

JAMES F. HILL.

Witnesses:
A. H. CHALFANT,
RAYMOND SHEEN.